US012791052B2

(12) United States Patent

Yurtdas et al.

(10) Patent No.: US 12,791,052 B2
(45) Date of Patent: Nov. 10, 2026

(54) FASTENER FOR PREVENTING THE ASSEMBLY PROBLEMS CAUSED BY MISALIGNMENT

(71) Applicant: NORM IZMIR CIVATA SANAYI VE TICARET ANONIM SIRKETI, Izmir (TR)

(72) Inventors: Sezgin Yurtdas, Izmir (TR); Sarper Dogan, Izmir (TR); Muhammed Burak Toparli, Izmir (TR); Umut Ince, Izmir (TR)

(73) Assignee: NORM IZMIR CIVATA SANAYI VE TICARET ANONIM SIRKETI, Izmir (TR)

( * ) Notice: Subject to any disclaimer, the term of this patent is extended or adjusted under 35 U.S.C. 154(b) by 413 days.

(21) Appl. No.: 18/578,316

(22) PCT Filed: Feb. 23, 2023

(86) PCT No.: PCT/TR2023/050176

§ 371 (c)(1),
(2) Date: Jan. 11, 2024

(87) PCT Pub. No.: WO2023/167651

PCT Pub. Date: Sep. 7, 2023

(65) Prior Publication Data

US 2024/0301909 A1 Sep. 12, 2024

(30) Foreign Application Priority Data

Mar. 2, 2022 (TR) ............................... 2022/003067

(51) Int. Cl.
*F16B 33/02* (2006.01)
*F16B 35/04* (2006.01)

(52) U.S. Cl.
CPC ............ *F16B 33/02* (2013.01); *F16B 35/047* (2013.01)

(58) Field of Classification Search
CPC ............................... F16B 33/02; F16B 35/047
See application file for complete search history.

(56) References Cited

U.S. PATENT DOCUMENTS

| | | | | |
|---|---|---|---|---|
| 3,520,343 | A | 7/1970 | Evans | |
| 4,069,730 | A * | 1/1978 | Gutshall ............ | F16B 25/0052 411/386 |
| 4,952,110 | A * | 8/1990 | Avgoustis ............ | F16B 35/047 411/386 |
| 5,088,869 | A | 2/1992 | Greenslade | |
| 6,062,786 | A * | 5/2000 | Garver .................. | F16B 35/047 411/386 |

(Continued)

FOREIGN PATENT DOCUMENTS

| | | | |
|---|---|---|---|
| EP | 0942181 | A2 | 9/1999 |
| EP | 0840859 | B1 | 11/2000 |

(Continued)

*Primary Examiner* — Eugene G Byrd

(74) *Attorney, Agent, or Firm* — Bayramoglu Law Offices LLC

(57) ABSTRACT

A fastener is provided. The fastener, in the assembly of fasteners, prevents cross threading that occurs when an externally threaded fastener is threaded into a female fastener that is not axially aligned, and the method of production thereof is also provided. The fastener includes a shaft, a head, and a catching section.

22 Claims, 7 Drawing Sheets

(56) References Cited

U.S. PATENT DOCUMENTS

| | | | | | |
|---|---|---|---|---|---|
| 6,089,986 | A * | 7/2000 | Reynolds | B21K 1/46 470/57 |
| 6,142,186 | A * | 11/2000 | Donovan | F16L 55/1108 138/96 T |
| 6,155,761 | A * | 12/2000 | Donovan | B21H 3/06 411/386 |
| 6,158,938 | A | 12/2000 | Savoji | |
| 7,438,512 | B2 * | 10/2008 | Jakuszeski | F16B 39/30 411/311 |
| 7,670,091 | B2 * | 3/2010 | Kato | F16B 35/047 411/386 |
| 9,267,527 | B2 * | 2/2016 | Dayton | F16B 25/0057 |
| 11,365,758 | B2 * | 6/2022 | Makino | F16B 33/02 |
| 11,846,311 | B2 * | 12/2023 | Horiuchi | F16B 35/047 |
| 2004/0009052 | A1 | 1/2004 | Jungman et al. | |
| 2007/0280803 | A1 * | 12/2007 | Pritchard | F16B 33/02 411/411 |
| 2015/0204370 | A1 * | 7/2015 | Serizawa | H01R 4/304 411/411 |
| 2016/0281761 | A1 | 9/2016 | Garver | |
| 2020/0370587 | A1 * | 11/2020 | Okuwaki | F16B 25/10 |
| 2021/0033136 | A1 * | 2/2021 | Garcha | F16B 33/004 |
| 2021/0254413 | A1 * | 8/2021 | Campbell | E21B 17/0423 |
| 2022/0403865 | A1 * | 12/2022 | Kim | F16B 7/182 |

FOREIGN PATENT DOCUMENTS

| | | | |
|---|---|---|---|
| EP | 3274601 | A1 | 1/2018 |
| FR | 2697875 | A1 | 5/1994 |
| JP | 2000329125 | A | 11/2000 |

* cited by examiner

FASTENER FOR PREVENTING THE ASSEMBLY PROBLEMS CAUSED BY MISALIGNMENT

CROSS-REFERENCE TO THE RELATED APPLICATIONS

This application is the national phase entry of International Application No. PCT/TR2023/050176, filed on Feb. 23, 2023, which is based upon and claims priority to Turkish Patent Application No. 2022/003067, filed on Mar. 2, 2022, the entire contents of which are incorporated herein by reference.

TECHNICAL FIELD

The present invention relates to a fastener which, in the assembly of fasteners, prevents cross threading that occurs when an externally threaded fastener is threaded into a female fastener that is not axially aligned, and the method of production thereof.

BACKGROUND

Fasteners are mechanical parts used to hold two or more components together in various sectors such as white appliances, construction, machinery manufacturing, construction, and railway, especially in the automotive industry. Generally, assembly is performed by engaging male fasteners such as bolts and screws into female fasteners such as nuts. In order for the connection to be made properly, the male fastener must engage in a suitable position with the female fastener, in particular, co-axially. In cases where the male fastener and the female fastener are tried to be assembled without being align with each other, there is a high probability of cross threading between the threads of the male fasteners and the female fasteners. If the male fastener is forced to pass into the female fastener by continuing its rotation, deformation due to cross threading may occur on the threads of the components.

However, since cross threading causes jamming between the threads of the male and female fasteners, it is not possible to align the male and female fasteners axially again to ensure a proper, reliable, and tight connection. Therefore, the person performing the assembly, or the machine must assemble the male fastener by aligning it axially with the female fastener without causing any thread jamming.

Along with the recent technological advances, in sectors such as the automotive industry where fasteners are employed extensively, mass production systems are used where high production capacity and zero-error production is aimed. In these sectors, the use of automation systems is increasing day by day to realize high production quality and fast production. In order to ensure a fast, precise, and proper connection without encountering the above-mentioned problems, in case the assembly of the male fastener carried out with the automation system, it must be ensured that the axis of the male fastener is aligned with the axis of the female fastener for each connection. It is exceedingly difficult to guarantee that the male fastener to be assembled with the automation system will be inserted into the female fastener at the same position or angle every time. Similarly, the same is true for the manual assembly of the male fastener. For this reason, a solution is needed, even when the male and female fasteners are not aligned axially, so that the male fastener can engage the female fastener without cross threading and a proper connection can be achieved.

Patent application numbered FR-A-2697875 relates to screws with an ogival tip, more specifically, to screws with a special end for adjusting the coaxiality of the screw with a threaded hole such as a nut. The said screw comprises a cylindrical body and a threaded portion extending helically around the cylindrical body and an ogival-shaped tip. The threaded portion also extends beyond the cylindrical portion along the ogival end of the screw. In case the axes of the male fastener and female fastener described in the application are not aligned, it is aimed to align the axes as the male fastener engages into the female fastener with the ogival end of the screw.

Patent numbered EP-B-0840859 relates to a fastener that prevents cross threading, comprising a first and a second end, a cylindrical surface having a continuous helix consisting of a plurality of thread turns where at least one thread turn is a transitional thread turn, and a guide tip. Thanks to the curved surface of at least one transitional thread turn, the fastener with said transitional thread turn passes over the thread turn of the fastener it passes into, in such a way that there is no thread jamming, so that the axes of both fasteners are aligned. In addition to shaping the machine threads formed on the fastener shaft described in the invention, specially designed thread rolling dies are needed to create the desired curvature in the transitional thread. Specially designed thread rolling dies have the mirror image of the threads to be shaped so that when the blank shaft is rolled between the dies to shape threads on the same, the desired curvature and radius can be produced in the transitional thread.

In the state of the art, special design stationary and reciprocating thread rolling dies, which are used to create the said thread forms on the shaft and/or end of the fastener, are needed in order to obtain the final threaded product after the cold forming process of fasteners having special thread forms in order to prevent cross threading is completed. This both increases the cost and requires special expertise since a design special to the thread form has been developed. The quality of the dies varies depending on the manufacturer, as the production of the desired quality dies requires special expertise, and since the thread rolling dies specially designed for the thread forms developed for the fastener that prevents cross threading are different from the traditional thread rolling dies. The quality of the thread rolling die also affects the performance of the fastener, whose thread form is shaped using the said die. For this reason, in order to ensure the continuity of the fastener's performance, providing the same quality rolling die obliges the fastener manufacturer to certain die manufacturers. This causes the cost of the thread rolling die to be much higher than when using traditional rolling dies. In addition, since the production of dies specially designed for the thread form of the fastener takes longer than the production of conventional dies, it requires the fastener manufacturer to stock up on the die, and this causes additional inventory costs.

Considering the above-mentioned issues, there is a need for a fastener in the state of the art that overcomes the above problems and prevents assembly problems caused by cross threading. In more detail, there is a need for a fastener where its thread form can be shaped with conventional rolling dies, which allows a proper connection by passing into the said fastener without cross threading in cases where its axis is not aligned with the axis of the fastener it passes into, regardless of the talent of the assembler or the sensitivity of the automation system used in the assembly.

SUMMARY

The main object of the invention is, in order to overcome the above-mentioned disadvantages in the state of the art, to provide a fastener, that prevents cross threading due to the fact that its axis is not aligned with the axis of the female fastener into which it passes to form the connection, and prevents assembly problems caused by cross threading.

Another object of the invention is to align the non-aligned axes of the fasteners that are engaged each other to establish a connection.

Another object of the invention is to provide a fastener that prevents cross threading with a thread form that can be shaped with conventional stationary and reciprocating thread rolling dies, which are widely used in forming the thread form of fasteners.

Another object of the invention is to provide a fastener with a specially developed shaft and end to prevent cross threading.

Another object of the invention is to provide a fastener that enables a proper connection by passing into the female fastener without cross threading in cases where the axis is not aligned with the axis of the female fastener it passes into, regardless of the ability of the assembler or the sensitivity of the automation system used in the assembly.

Another object of the invention is to ensure that the axis of the male fastener aligns with the axis of the female fastener while the male fastener passes into the female fastener without cross threading, during the rotational movement of the male fastener after its contact with the female fastener in case the axes of the fasteners assembled to each other for connection are not aligned.

The present invention relates to a fastener having a catching and a coupling section for meeting the above-mentioned needs in connection with fasteners, overcoming the problems, and realizing the objects set forth. The said fastener is externally threaded, and the coupling section on the shaft and the catching section, which is also the end part of the fastener, ensures that the axis of the said fastener can be aligned with the axis of the female fastener it passes into. While the fastener continues its rotation after its contact with the female fastener, the incompleted threads in the coupling section of the fastener cam over the front thread of the female fastener, in other words, without jamming, and then the threads in the body section of the fastener shaft are assembled by engaging the thread of the female fastener into which they pass. Thereby, the desired assembly is realized thanks to the proper engagement of the fasteners.

The fastener according to the present invention is an externally threaded fastener such as a bolt, or screw, and comprises a head that transfers torque applied rotationally by a standard tool such as a bit or wrench to the fastener shaft for assembly (tightening) and loosening, a shaft that extends towards the end from the bearing surface of the head and consists of two parts, a threaded portion extending helically, starting at any level around the outer surface of the first portion of the shaft, and an end adjacent to the shaft and guides the fastener.

The head of the fastener according to the present invention can be of any standard or custom shape, such as a cylinder, flat cylinder, countersink, internal socket, external socket, hexagon, square, triangle, parallelogram, external Torx, button, raised cheese, mushroom, hexagon socket, pan; and preferably is a hexagon head bolt. The said fastener can also be produced with or without a flange.

According to one embodiment of the present invention, the shaft portion of the fastener extends from the bearing surface of the head to the end and consists of two parts, the body, and the coupling. The body section of the shaft starts from the bearing surface of the head and extends towards the coupling section, and there is a threaded portion extending helically on the outer surface of the shaft. Said threaded portion continues to extend helically on the outer surface of the shaft, starting from any level around the shaft body and towards end tip of the coupling section of the shaft. The structure of the thread in the body section of the shaft can be of any standard or special structure such as whitworth and trapezoidal. In the fastener according to the invention, the coupling section of the shaft starts from the end of the body section of the shaft and the coupling section has a curved outer surface. Said curved surface is tangent to the body section of the shaft at the intersection of the plane extending perpendicular to the longitudinal axis of the fastener at the level where the body section ends and the end of the body section.

The catching section of the fastener starts from the point where the coupling section of the shaft ends. The catching section is also the end of the fastener. There is a boundary line between the catching and coupling sections. The coupling section of the fastener is located between the body section of the shaft and the boundary line.

According to another embodiment of the present invention, the catching section of the fastener also consists of two parts. The first portion of the catching section starting from the boundary line between the catching and coupling section can be in any standard or special shape, preferably in a cylindrical shape. Adjacent to the first portion of the catching section is the second portion. The diameter of the body section of the shaft is larger than the diameter of the first portion of the catching section. The second portion of the catching section also has a curved surface. This curved surface is tangent to the first portion of the catching section at the intersection of the plane extending perpendicular to the longitudinal axis of the fastener at the level where the first portion of the catching section ends, and the end of the first portion of the catching section. The curved surface of the second portion of the catching section terminates at the end of the fastener.

In another embodiment of the present invention, the curved surface of the coupling section denotes an arc of the circle whose center is on the plane extending perpendicular to the longitudinal axis of the fastener at the level where the body section of the shaft ends, and outside the boundaries of the shaft. The curved surface of the second portion of the catching section also denotes an arc of the circle whose center is located within the boundaries of the catching section and on the plane extending perpendicular to the longitudinal axis of the fastener at the level where the first portion of the catching section ends. The radius of the circle including the arc indicating the curved surface of the catching section is greater than that of the radius of the circle including the arc indicating the curved surface of the second portion of the catching section.

In the fastener according to the present invention, the threaded portion extending helically in a continuous manner starting from any level around the outer surface of the body section of the shaft continues to extend helically also around the outer surface of the coupling section of the shaft. However, the difference between the major diameter and minor diameter of the thread in the threaded portion of the coupling section gradually decreases after a certain point of the coupling section or from the level where the body section of the shaft ends, and the threaded portion ends at the point where this difference is zero. As the threaded portion around the coupling section extends helically on the surface of the coupling section, the difference between the major diameter and the minor diameter of the thread in the threaded portion gradually decreases, and thus the thread height decreases. As the difference between the diameters of the major thread and minor thread in the threaded portion of the coupling section starts to decrease, the threads turn into an incomplete form.

In the scope of the present invention, the term of "major diameter" refers to the diameter measured from the apex (highest point) of the threads in the threaded portion of the fastener according to the invention. The term of "minor diameter" also refers to the diameter measured from the bottom of the threads in the threaded portion of the fastener according to the invention. The term of "thread height" is also the distance between the major diameter and the minor diameter of the threads in the threaded portion of the fastener according to the invention.

However, according to the present invention, in the threaded portion that extends continuously helically around the outer surface of the fastener shaft, the pitch value is the same along the threaded portion, that is, in both portions of the shaft.

In the scope of the present invention, the term of "completely-formed thread" refers to a thread that is in its full form, both at the thread root and the thread crest. The shape of the completely-formed threads can be of any standard or special shape such as whitworth and trapezoidal. If the body section of the shaft in the fastener according to the invention is of a standard form, such as cylindrical, the entire threaded portion of the shaft extending helically around the surface of the body section can be entirely composed of completely-formed threads. However, in case the body section of the shaft is in a special form such as triple lobular, four lobular, or elliptical, there may be completely-formed threads in some parts of the threaded portion that extends continuously helically on the surface of the body section of the shaft, and incompleted threads may be found in some parts.

In the scope of the present invention, the term of "incompleted thread" is a thread that has both root and crest of thread in which the crest is not in the exact form and/or height it should be for the completely-formed thread while the root remains the same, and in the fastener according to the present invention, at the threaded portion around the coupling section of the shaft with a curved surface, the difference between the root and crest of the thread gradually decreases from the level where the body section of the shaft ends or after a certain point in the coupling section as the threaded portion extends continuously helically towards the catching section.

In the scope of the invention, the term "plane" is used to help imagine the location of the element/feature described.

The incompleted threads in the threaded portion extending helically around the curved surface of the coupling section in the fastener according to the present invention ensure the fastener easily enter the female fastener into which it engages during assembly without cross threading and ensure the alignment of the axes of the fasteners. While the rotational movement of the fastener according to the invention is maintained in the female fastener, the threads in the body section of the shaft, which are located in the continuation of the incompleted thread in the coupling section, engage the threads of the female fastener and it is ensured that the said fastener advances collinearly in align with the female fastener.

In a preferred embodiment of the present invention, the fastener according to the invention is a male fastener and includes externally threaded fasteners such as bolts, screws, and wheel bolts, which have a continuously helically extending threaded portion with threads on the outer surface of the shaft. An internally threaded female fastener such as a nut with a continuously helically extending threaded portion with threads extending towards the center of the fastener through the hole located in the middle of the fastener into which the fastener according to the invention passes for connection purposes, or it could be a female fastener with a non-threaded hole. However, with the fastener according to the invention, a connection can also be provided by assembling a previously drilled or non-drilled workpiece.

In another embodiment of the present invention, due to the fact that the catching section of the male fastener preferably consists of a cylindrical body section and a curved coupling section, when the longitudinal axis of the said fastener is not aligned with the longitudinal axis of the female fastener into which it passes, the axis of the fastener self-aligns and ensure the fastener entering to the female fastener at an appropriate angle to align with the axis of the female fastener. In case the female fastener into which the fastener according to the invention is inserted is an internally threaded fastener, while the said fastener continues its rotational movement, with the boundary line of the fastener being in line with the center of the first completely-formed thread of the female fastener that contacted by the fastener, or further forward than the other end of the female fastener, the incompleted thread in the coupling section cam over the threads in the female fastener, it makes it possible for the male fastener to axially align with the female fastener.

Accordingly, the catching section of the fastener in accordance with the invention is designed such that the level of the boundary line is in a position that makes it possible for the male fastener to align with the female fastener axially and the incompleted threads in the coupling section cam over the threads of the female fastener. After the axis of the fastener according to the invention is aligned with the axis of the female fastener, when the rotational movement of the fastener is continued, the threads of the fasteners interlock, and a proper connection is achieved.

The length of the coupling section in the shaft of the fastener according to the invention is the distance between the level where the body section of the shaft ends and the boundary line. The length of the catching section of the fastener according to the invention is also the distance between the boundary line between the coupling section and the catching section and the level where the catching section of the fastener ends.

In one embodiment of the present invention, the length of the coupling section of the fastener is 0.6 to 6.0 times, preferably 0.8 to 5.0 times, and more preferably 1.1 to 4.5 times the length of the catching section.

In another embodiment of the present invention, the curved surface in the catching section of the fastener forms the surface of the second portion of the catching section, and the length of the second portion of the catching section is the distance between the level where the first portion of the catching section ends and the level where the catching section of the fastener ends. According to a preferred embodiment of the present invention, the length of the second portion of the catching section is 0.1 to 3 times, preferably 0.2 to 2.5 times, more preferably 0.5 to 2 times the thread pitch (p).

In the scope of the present invention, the term of "thread pitch (p)" means the distance the fastener is rotated one full turn in the metric system. Within the scope of the present invention, the pitch value in the threaded portion extending helically on the outer surface of the fastener shaft is constant in all parts of the threaded portion.

The fastener according to the present invention is produced according to the conventional cold forging process, and the blank, in other words, the non-threaded form of the shaft part of the said fastener is produced as a result of the cold forging process. The coupling section and catching section, which ensures that the fastener according to the present invention aligns with the female fastener without cross threading, is also shaped during the production of the said fastener by the cold forging process. The fastener according to the present invention is produced when the thread rolling process of non-threaded fastener obtained at the end of the cold forging process is completed using conventionally stationary and/or reciprocating dies. Therefore, the fastener according to the present invention is produced without the need for specially designed stationary and/or reciprocating dies and without additional costs during the shaping of the threaded portion on the shaft after the cold forging process.

The following references to the figures and the detailed description are intended to provide a better understanding of the invention and are not intended to limit the scope of the invention. The components in the figures are not scaled, and the emphasis is only on explaining the principles of the invention. Within the scope of the invention; different modifications of the parts in the figures represented by references are also possible.

DETAILED DESCRIPTION OF THE EMBODIMENTS

Figure 1:
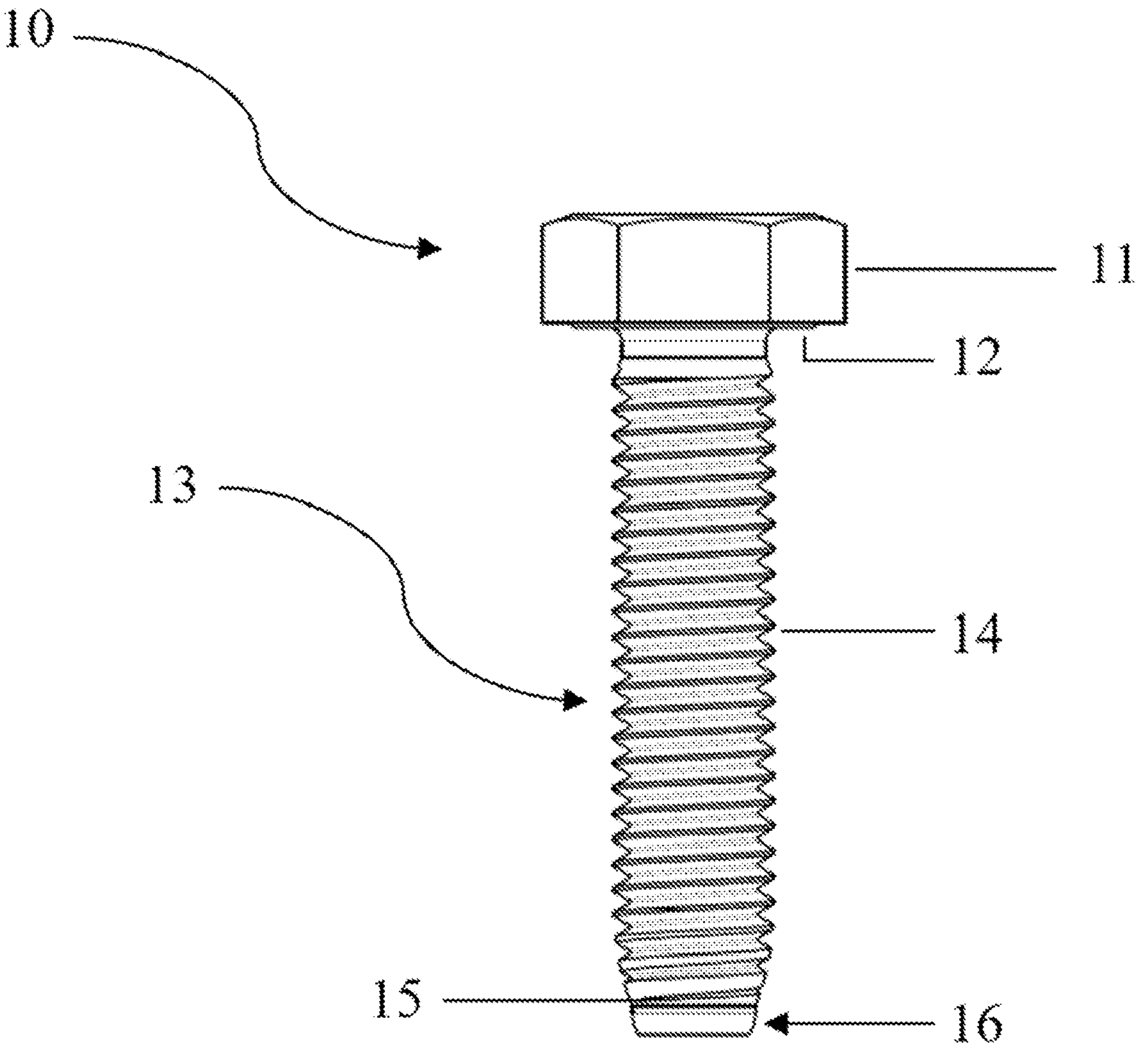
FIG. 1 is a front view of the fastener according to the invention.

The present invention relates to a fastener having a shaft (13) and specially designed coupling and catching sections at the end, which, during assembly, can align its axis with the axis of the other fastener to which it connects and prevent cross threading.

In the detailed description given below, each part of the fastener represented by reference numerals and their interrelationships are explained in detail in order to make the invention more understandable, with reference to the figures in which the details of the preferred embodiments of the invention are shown schematically.

In FIG. 1, where the front view of the fastener (10) according to the invention is given, the said fastener (10) is an externally threaded fastener such as a bolt or screw and comprises a head (11) that provides the torque applied rotationally by a standard bit or wrench for the assembly transferred to the fastener (10) in an appropriate manner, a shaft (13) extending from the bearing surface of the head (12) towards the end (16) and consisting of two parts, a threaded portion (14) extending helically on the outside of the shaft, and a catching section (16) located adjacent to the shaft (13) and guiding the fastener (10). The structure of the threads in the threaded portion (14) starting from any level of the shaft (13) and extending continuously helically on its outer surface can be of any standard or special form such as whitworth and trapezoidal.

Figure 2:
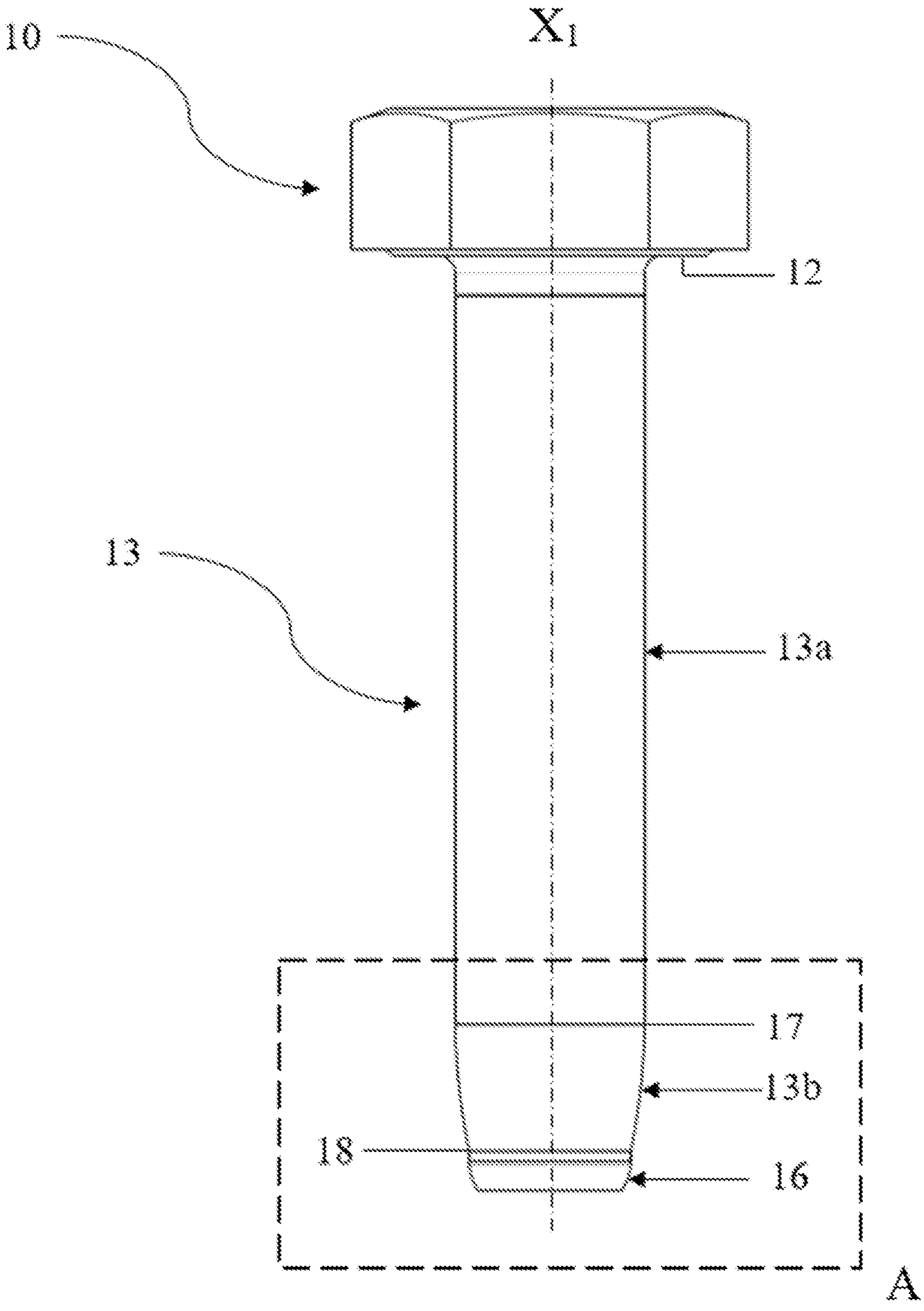
FIG. 2 is a front view of the shaft portion of the fastener according to the invention in blank form (without the threaded portion).

As can be seen in FIG. 2, the shaft (13) consists of two parts, the body section (13*a*) and the coupling section (13*b*). In FIG. 2, as seen from the front view in which the blank form of the fastener shaft (13), in other words, the shaft (13) where the threaded portion (14) extends continuously helically around the outer surface of the shaft (13) not formed is shown, the body section (13*a*) extends axially towards the coupling section (13*b*) of the shaft from the bearing surface of the head (12) and it may be cylindrical or of any particular geometric structure, but according to a preferred embodiment of the invention, it is cylindrical. The coupling section (13*b*), which is adjacent to the body section (13*a*) of the shaft, has a curved surface. As it can be understood more easily in FIG. 3, where the enlarged view of the part A shown in FIG. 2 is given, the curved surface of the coupling section (13*b*) of the shaft is tangent to the body section (13*a*) of the shaft, at the intersection of the plane extending perpendicular to the longitudinal axis of the fastener ($X_1$) at the level where the body section ends (17) and the end of the said body section (17).

Adjacent to the coupling section (13*b*) is the catching section of the fastener (16). The catching section of the fastener (16) according to the invention is also the end of the fastener. The coupling section (13*b*) and the catching section (16) are separated from each other by the boundary line (18). The fastener coupling section (13*b*) is located between the end of the shaft body section (17) and the boundary line (18). The outer surface of the coupling section (13*b*) also extends curved from the end of the body section (17) of the shaft towards the boundary line (18).

The catching section (16) of the fastener (10) according to the present invention also consists of two parts. The first portion of the catching section (16*a*), located adjacent to the boundary line (18) between the catching section (16) and the coupling section (13*b*), is preferably cylindrical, and the second portion (16*b*) is located adjacent to the first section (16*a*). The diameter ($d_1$) of the body section (13*a*) of the shaft is larger than the diameter ($d_2$) of the first portion of the catching section (16*a*). The second portion of the catching section (16*b*) has a curved surface as in the coupling section (13*b*). This curved surface is tangent to the first portion (16*a*) of the catching section (16) at the intersection of the plane extending perpendicular to the longitudinal axis ($X_1$) of the fastener at the level where the first portion of the catching section (19) ends and the end of the first portion of the catching section (19). The curved surface of the second portion (16*b*) of the catching section ends at the level (20) where the catching section (16) of the fastener ends, in other words, at the level of the catching section (16) farthest from the head (11) of the fastener (16) according to the invention.

Figure 3:
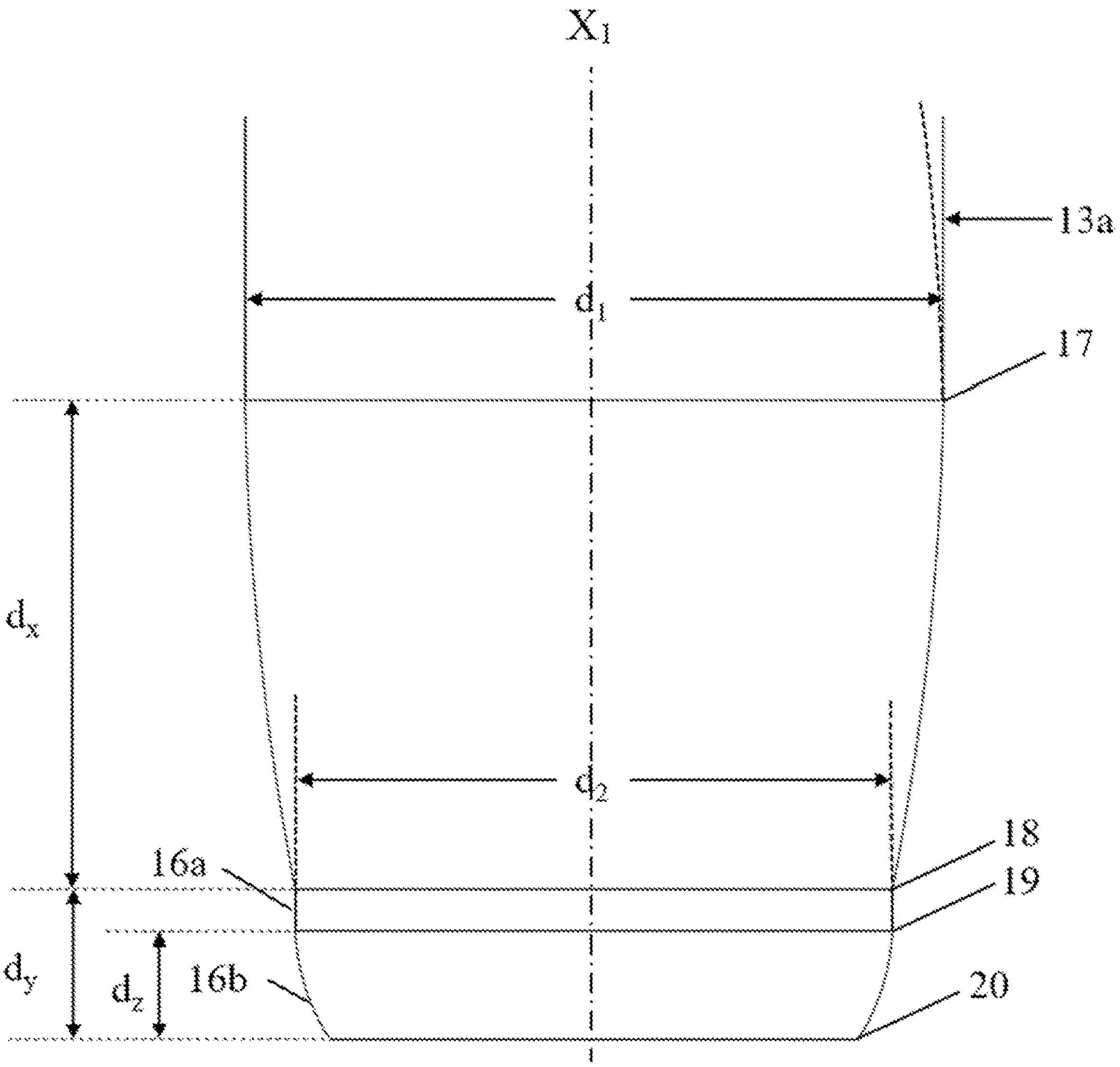
FIG. 3 is an enlarged view of the Z-section of the fastener according to the invention shown in FIG. 2.

As seen in FIG. 3, the length of the coupling section ($d_x$) in the shaft of the fastener (13) according to the invention is the distance between the level (17) where the body section of the shaft (13*a*) ends and the boundary line (18). The length ($d_y$) of the catching section (16) of the fastener (10) according to the invention is the distance between the boundary line (18) between the coupling section (13*b*) and the catching section (16) and the level (20) where the catching section of fastener ends.

In one embodiment of the present invention, the length of the coupling section of the fastener ($d_x$) is 0.6 to 6.0 times, preferably 0.8 to 5.0 times, and more preferably 1.1 to 4.5 times the length of the catching section ($d_y$).

In another embodiment of the present invention, the length of the second portion of the catching section ($d_z$) of the fastener is the distance between the level (19) where the first portion of the catching section ends, and the level (20) where the catching section of fastener (16) ends. According to a preferred embodiment of the present invention, the length of the second portion of the catching section ($d_z$) is 0.1 to 3 times, preferably 0.2 to 2.5 times, more preferably 0.5 to 2 times the thread pitch (p).

Figure 4:
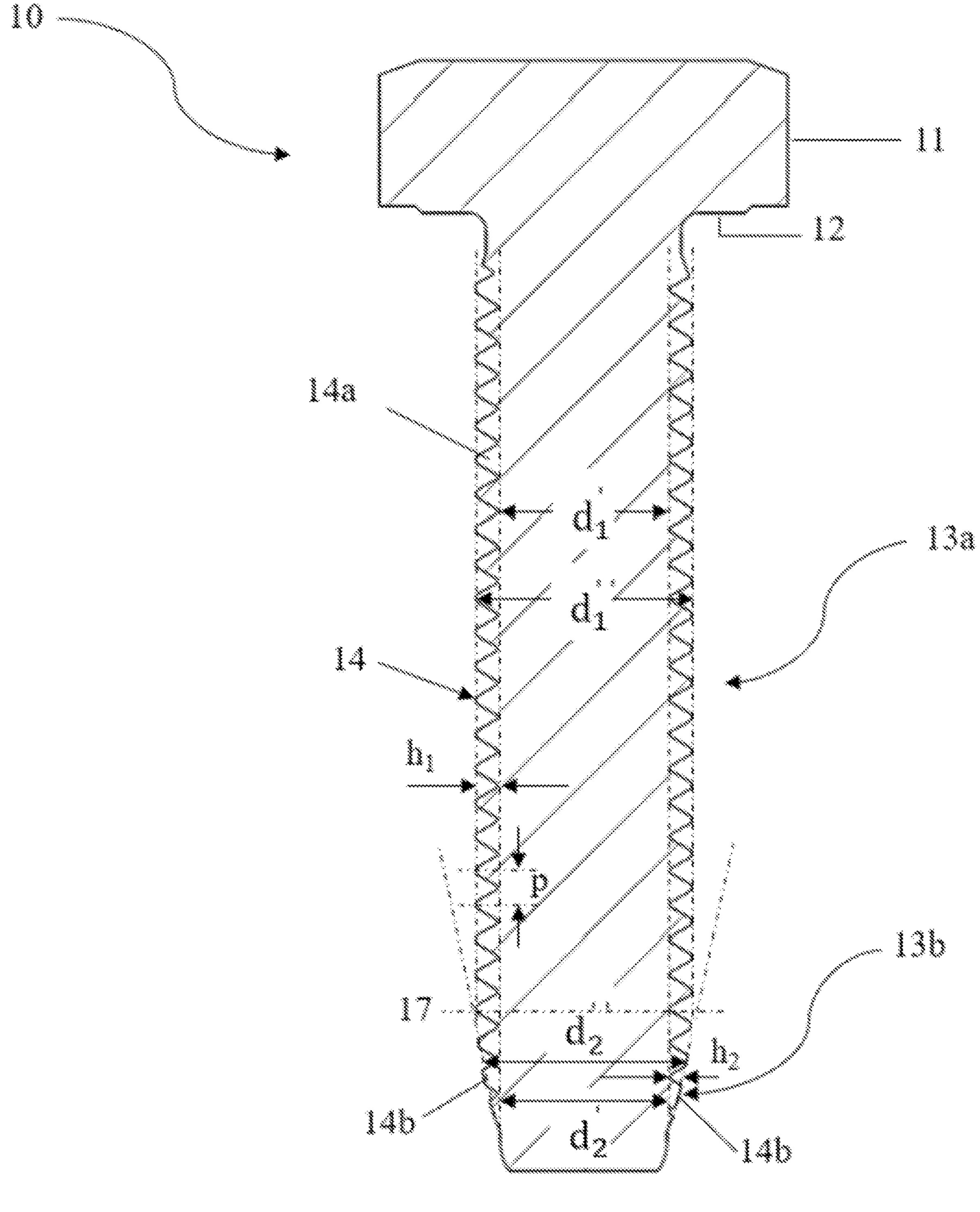
FIG. 4 is a view of the vertical cross-sectional area of the fastener according to the invention.

In one embodiment of the present invention, FIG. 4 shows the minor diameters ($d_1$', $d_2$'), major diameters ($d_1$", $d_2$") and thread heights ($h_1$, $h_2$) of the threaded portion (14) at the body section (13*a*) and the coupling section (13*b*) of the shaft extending axially along the longitudinal axis ($X_1$) of the fastener (10) towards the catching section (16), starting from the bearing surface of the head (12). According to one embodiment of the invention, if the body section (13*a*) of the shaft is preferably cylindrical, the minor diameter ($d_1$') and the major diameter ($d_1$") are constant along the threaded portion (14) extending continuously helically starting from any level around the outer surface of the body section (13*a*) of the shaft. In case the minor diameter ($d_1$') and major diameter ($d_1$") in the threaded portion (14) of the shaft in the body section (13*a*) are the same along the threaded portion (14) in the body section (13*a*), the difference minor diameter ($d_1$') and the major diameter ($d_1$"), therefore the thread height ($h_1$), remains constant along the threaded portion (14) in the body section (13*a*). Accordingly, the threaded portion in this section (13*a*) may consist of completely-formed threads (14*a*).

According to another embodiment of the invention, in case body section (13*a*) of the shaft has a special form such as triple lobular, four lobular, or elliptical, the difference between the minor diameter ($d_1$') and the major diameter ($d_1$") may vary along the threaded portion (14) extending helically (14) around the outer surface of the body section of the shaft (13*a*). If this is the case, the thread height ($h_1$) may also differ along the threaded portion (14) extending helically around the outer surface of the body section of the shaft (13*a*). Accordingly, the threads (14*a*) in the threaded portion of the body section (14) of the shaft may be in completely-formed form in some parts of the threaded portion (14) and incompleted form in some other parts.

The coupling section (13*b*) of the shaft is located adjacent to the body section (13*a*) of the shaft. The threaded portion (14), which extends helically around the outer surface of the shaft body section (13*a*) starting from any level of the shaft (13), continues to extend helically around the outer surface of the coupling section (13*b*) of the shaft in an uninterrupted manner. However, in the threaded portion extending helically around the coupling section (13*b*) of the shaft, the difference between the the minor diameter ($d_2$') and the major diameter ($d_2$") and therefore, the thread height ($h_2$), gradually decreases starting from any level of the coupling section (13*b*), preferably from the level where the body section of the shaft ends (17), and the threaded portion (14) ends at the point (15) where this difference is zero (FIG. 1). There are incompleted threads (14*b*) in the threaded portion (14), which extends continuously helically around the coupling section (13*b*), where the difference between the minor diameter ($d_2$') and the major diameter ($d_2$"), and therefore, the thread height ($h_2$) gradually decreases.

However, according to the present invention, the pitch value in the threaded portion (14) that extends continuously helically on the outer surface of the fastener shaft (13) is the same along the threaded portion (14), that is, in both parts (13*a* and 13*b*) of the shaft.

In the preferred embodiment of the present invention, the fastener is a male fastener (10) with an externally threaded form, and the fastener into which the said fastener (10) engages in order to establish a connection, is an internally threaded female fastener (40) with a continuously helically extending threaded portion (43) comprising threads (44) extending towards the center of the fastener through the hole (42) in the middle of said fastener.

According to another embodiment of the invention, the fastener into which the fastener according to the invention (10) is engaged in order to establish a connection may be a female fastener having a non-threaded hole. However, the fastener (10) according to the invention can also be assembled on a pre-drilled or non-drilled workpiece to form a connection.

Figure 5E:
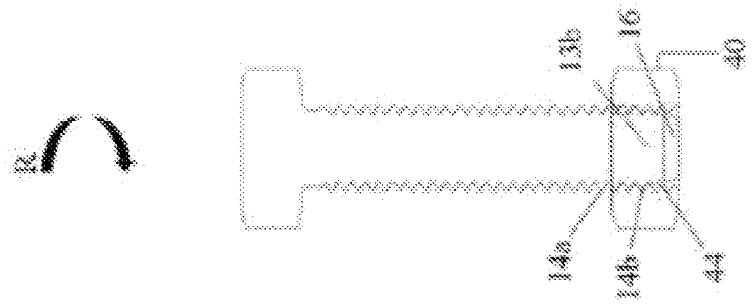
FIGS. 5A-5E are step by step views of the positions of the fastener according to the invention during assembly, with respect to the female fastener.
Figure 5D:
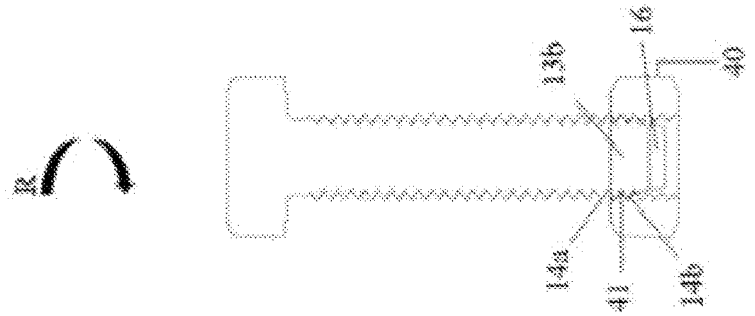
Figure 5C:
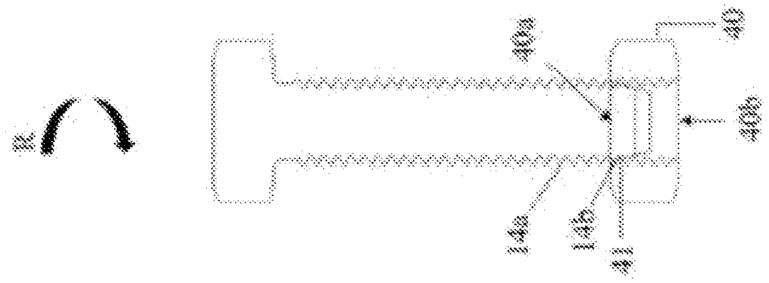
Figure 5B:
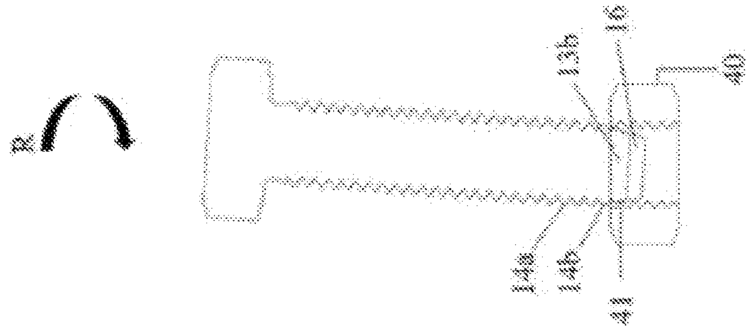
Figure 5A:
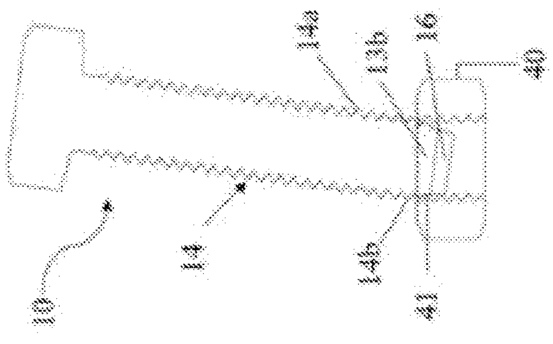

The fact that the catching section of the male fastener (10) according to the invention is composed of the first portion (16*a*) in preferably cylindrical form and the second portion (16*b*) which is curved ensure the axis ($X_1$) to enter the female fastener at a suitable angle to be self-aligning with the axis of the female fastener ($X_2$), when the longitudinal axis ($X_1$) of the said fastener is not aligned with the longitudinal axis ($X_2$) of the female fastener (40) into which it passes. However, in the fastener (10) according to the invention, the coupling section (13*b*), which has a threaded portion (14) extending continuously helically around its curved surface and comprising incompletely formed (14*b*) threads, where the difference between the minor diameter ($d_2$') and the major diameter ($d_2$") gradually decreases, ensures that the male fastener (10) according to the invention becomes coaxial with the female fastener (40) and goes forward in the female fastener (40) without cross threading. As an example, the positions of the said fastener (10) relative to an internally threaded female fastener (40) are shown in FIGS. 5A-5E step by step during the assembly of the male fastener (10) according to the invention. Accordingly, in more detail, in the assembly of the male fastener (10) according to the invention, which enters an internally threaded female fastener (40) at an appropriate angle thanks to the catching section (16), as the torque applied fastener (10) continues its rotational movement in the direction (R) shown in FIGS. 5B-5E, the incompleted threads (14*b*) in the coupling section (13*b*) also cam over threads of the female fastener (41) without cross threading and the fastener (10) coaxially aligns with the female fastener (40). Thus, a proper connection between the two fasteners (10, 40) is achieved. While the rotational movement (R) of the fastener (10) continues, the threads (14*a*) in the body section of the shaft (13*a*) also couple the threads (44) of the female fastener properly, and thanks to the proper engagement of the threads of the two fasteners, the male fastener (10) can easily go forward inside the female fastener (40) and the desired connection is achieved (FIGS. 5D-5E).

Figure 6:
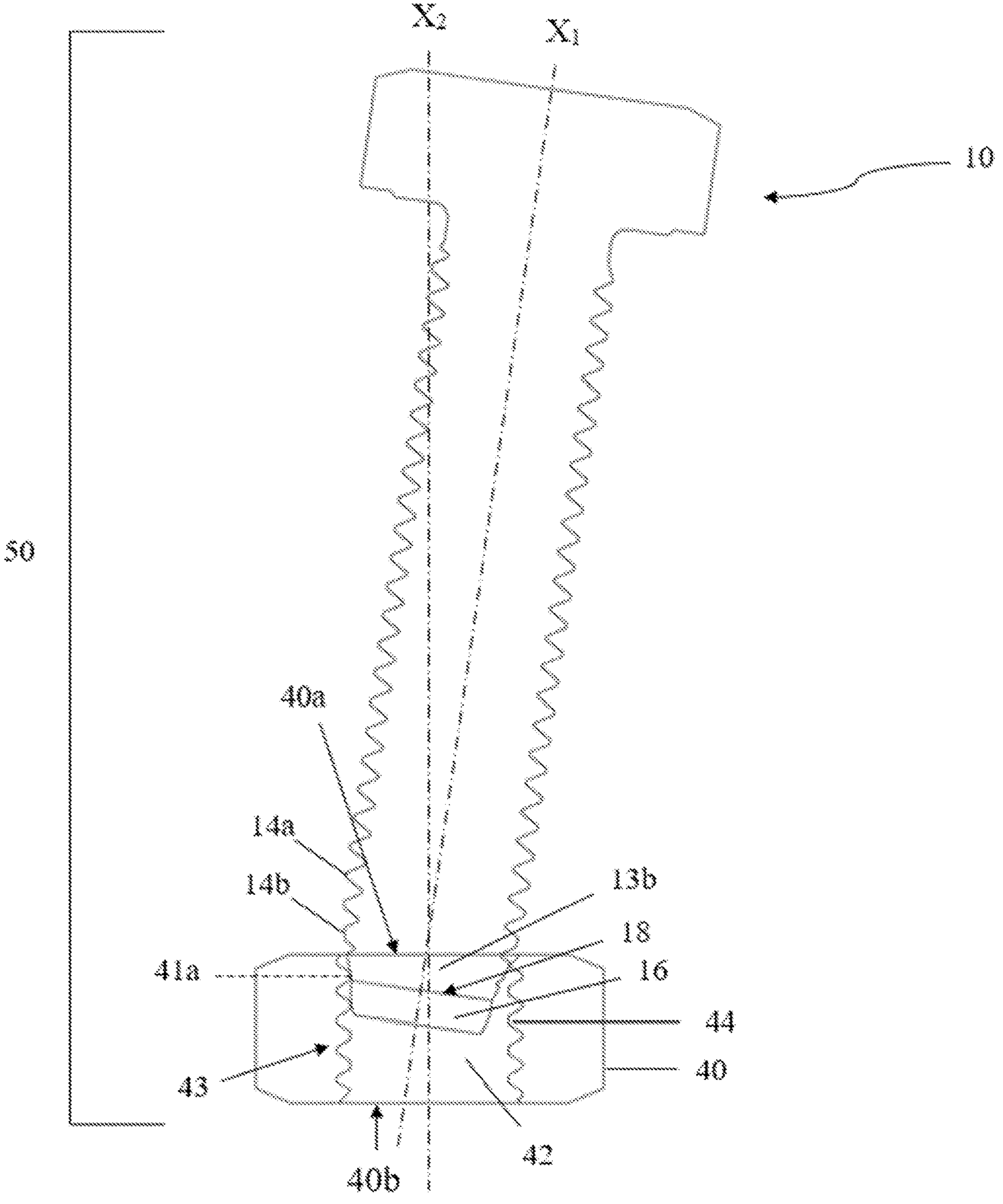
FIG. 6 is a front view of a fastener system comprising the fastener according to the invention and the female fastener into which it passes, showing the entry position of the fastener according to the invention to the female fastener.

In another embodiment of the present invention, as seen in the connection system (50) according to the invention shown in FIG. 6, without the longitudinal axes of the fasteners ($X_1$ ve $X_2$) being aligned, as the male fastener (10) continues to move rotationally after entering the hole (42) from one end (40*a*) of the female fastener (40) to establish a connection, with the level of the boundary line (18) of the fastener (10) being in line with the center of the first completely-formed thread (41*a*) of the female fastener (40) it comes across and contacts, or further towards the other end of the female fastener (40*b*), the incompleted threads (14*b*) in the coupling section (13*b*) cam over the threads (44) in the female fastener and the fastener (10) moves forward without cross threading. The male fastener (10) coaxially aligns with the female fastener (40) as the incompleted threads (14*b*) in the coupling section cam over the threads (44) of the female fastener.

The catching section (16) in the fastener according to the invention is designed to ensure that the level of the boundary line (18) to be at a position that allows for the male fastener (10) to be coaxially aligned with the female fastener (40) as the incompleted threads (14*b*) at the coupling section (13*b*) cam over the threads (44) in the female fastener when the male fastener (10) enters the female fastener (40). The female fastener (40) has a continuous helical threaded portion (43) in which the threads (44) extending towards the longitudinal axis ($X_2$) of the said fastener (40) are located along the hole (42) in the middle of said fastener (40). As the male fastener (10) continues its rotational movement within the hole of the female fastener (42), the first completely-formed thread of the female fastener (41) that the boundary line contacts is the first completely-formed thread of the female fastener (41) on the side where the catching section (16) contacts the female fastener. When the male fastener (10) is rotated (R) manually or by an automation system, the incompleted threads (14*b*) in the coupling section (13*b*) cam over the female fastener threads (44) without cross threading and the threads in the body section (13*a*) of the shaft (14*a*) clamp to the threads (44) of the female fastener, advancing on the female fastener (40), thereby a proper connection is ensured (FIGS. 5D-5E).

Figure 7:
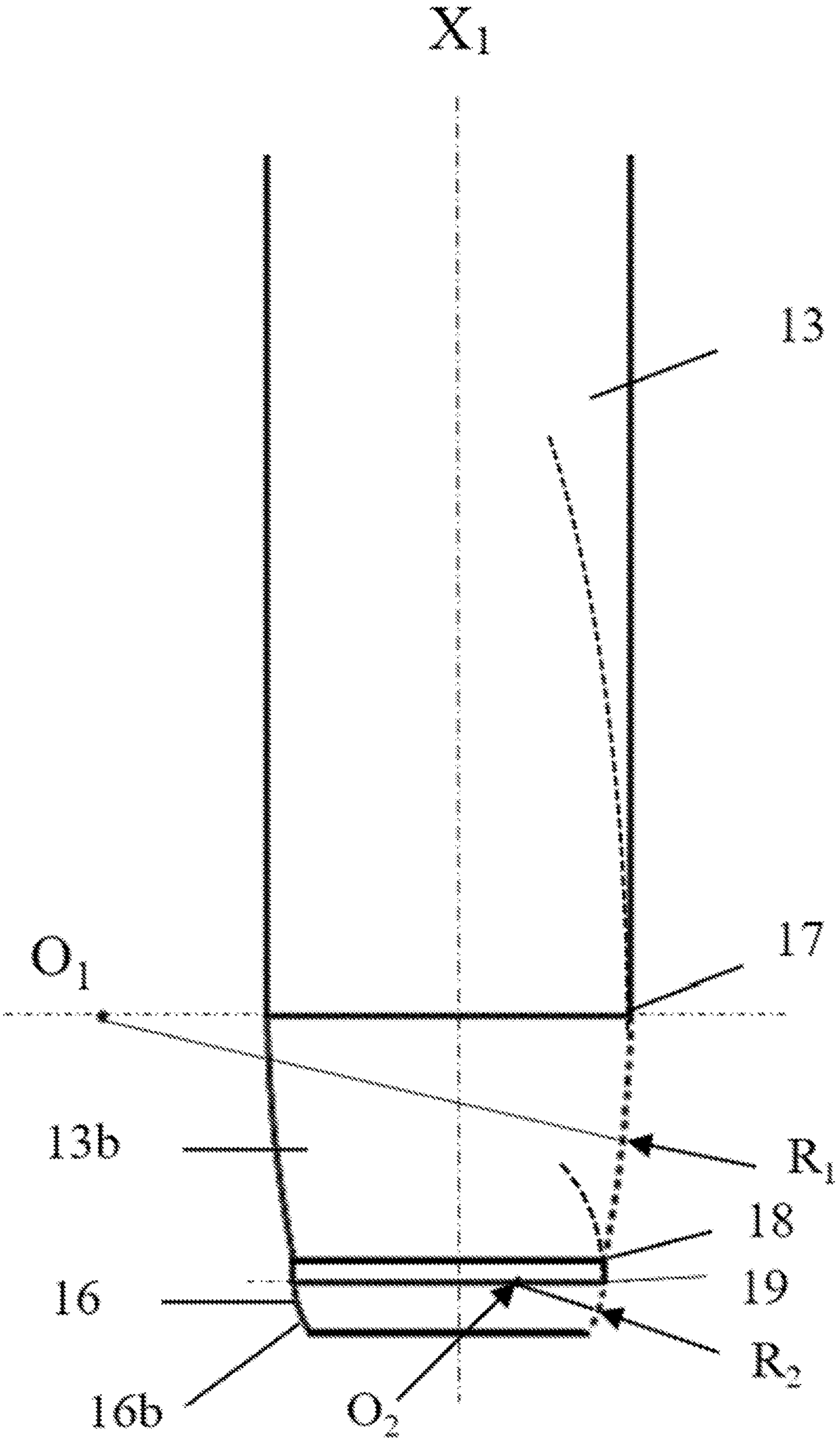
FIG. 7 is a representative view of the fastener according to the invention with the shaft part in blank form (without the threaded portion), showing the center points and radii of the circles to which, the arcs formed by the curved surfaces in the coupling section and the catching section belong.

In the fastener (10) according to the present invention, the surface of the coupling section (13*b*) of the shaft and the surface of the second portion of the catching section (16*b*) are curved. In more detail, the curved surface of the coupling section (13*b*) denotes an arc of the circle whose center ($O_1$) is located outside the boundaries of the shaft (13) and is on the plane extending perpendicular to the longitudinal axis ($X_1$) of the fastener at the level (17) where the shaft body section ends. The curved surface of the second portion of the catching section (16*b*) is also an arc of the circle whose center ($O_2$) is located within the boundaries of the catching section (16) and on the plane extending perpendicular to the longitudinal axis ($X_1$) of the fastener at the level (19) where the first portion of the catching section ends. The centers ($O_1$, $O_2$) of the said circles are represented in FIG. 7. The radius ($R_1$) of the circle to which the arc indicating the curved surface of the coupling section (13*b*) belongs is larger than the radius ($R_2$) of the circle to which the arc indicating the curved surface of the second portion of the catching section (16*b*) belongs.

Therefore, the present invention may be best adapted to achieve the above-mentioned objects and the intended results and advantages. Although a preferred embodiment of the present invention has been explained in detail above with figures and reference numbers to render the invention clearer, it should be noted that modifications and adaptations made to the technical elements of the invention within the scope of the invention are also included in order to achieve the same or similar objects within the scope of the invention.

DESCRIPTION OF THE REFERENCE NUMBERS IN THE FIGURES

10: fastener
11: fastener head
12: bearing surface of fastener head
13: fastener shaft
13*a*: body section of fastener shaft
13*b*: coupling section of fastener shaft
14: threaded portion of fastener
14*a*: each of the threads in the threaded portion extending continuously helically in the body section of the shaft
14*b*: each of the incompleted threads in the threaded portion extending continuously helically in the coupling section of the shaft
15: the point where the continuous helical threaded portion of the shaft ends
16: catching section of fastener
16*a*: first portion of the catching section
16*b*: second portion of the catching section
17: the level where the body section of the shaft ends
18: boundary line between the coupling section of the shaft and the catching section
19: end of the first portion of the catching section
20: end of the catching section
40: female fastener
40*a*: the end of the female fastener in which the male fastener is inserted
40*b*: other end of the female fastener
41: first completely-formed thread of female fastener
41*a*: center of the first completely-formed thread of female fastener
42: hole of the female fastener
43: threaded portion of the female fastener
44: each of the threads in the threaded portion of the female fastener
50: fastener system
$X_1$: longitudinal axis of the male fastener
$X_2$: longitudinal axis of the female fastener
$d_x$: the length of the coupling section of the shaft
$d_y$: the length of the catching section
$d_z$: length of the second portion of the catching section
$d_1$: the diameter of the body section of the shaft
$d_2$: diameter of the first portion of the catching section
$d_1'$: minor diameter of the thread of the body section of the shaft
$d_1''$: major diameter of the thread of the body section of the shaft
$d_2'$: minor diameter of thread of the coupling section
$d_2''$: major diameter of thread of the coupling section
$h_1$: height of thread of the body section of the shaft
$h_2$: height of thread of the coupling section of the shaft
$O_1$: the center of the circle including the arc formed by the curved surface of the coupling section of the shaft
$O_2$: the center of the circle including the arc formed by the curved surface of the second portion of the catching section
$R_1$: the radius of the circle including the arc indicating the curved surface of the coupling section of the shaft
$R_2$: the radius of the circle including the arc indicating the curved surface of the second portion of the receiving section

What is claimed is:

1. A fastener, comprising;

a shaft, wherein the shaft comprises two parts composed of a body section and a coupling section and has a threaded portion comprising more than one thread with first and second minor diameters and first and second major diameters, and the threaded portion extends helically around an outer surface of the shaft starting at any level, a head, wherein the head transfers torque applied by a tool to the shaft for tightening and loosening, a catching section, wherein the catching section is adjacent to the shaft and guides the fastener and wherein the catching section is thread-free, wherein the threaded portion extending helically around the shaft runs continuously from the body section to the coupling section of the shaft, and the threaded portion in the coupling section has incomplete threads, wherein a difference between the second minor diameter and the second major diameter decreases gradually towards the catching section such that the threaded portion ends in the coupling section where said difference is zero, which is adjacent to the catching section.

2. The fastener according to claim 1, wherein the coupling section of the shaft has a curved surface.

3. The fastener according to claim 2, wherein the coupling section of the shaft has the curved surface tangent to the body section of the shaft, at an intersection of a plane extending perpendicular to a longitudinal axis of the fastener at a level where the body section ends and an end of the body section.

4. The fastener according to claim 2, wherein the curved surface of the coupling section of the shaft denotes an arc of a circle, a center of the curved surface of the coupling section is located on a plane extending perpendicular to a longitudinal axis of the fastener from a level where the body section of the shaft ends and outside a boundary of the shaft.

5. The fastener according to claim 1, wherein the catching section comprises a first portion and a second portion.

6. The fastener according to claim 5, wherein the second portion of the catching section has a curved surface.

7. The fastener according to claim 6, wherein the second portion of the catching section has the curved surface tangent to the first portion of the catching section at an intersection of a plane extending perpendicular to a longitudinal axis of the fastener at a level where the first portion of the catching section ends and an end of the first portion of the catching section ends.

8. The fastener according to claim 6, wherein the curved surface of the second portion of the catching section denotes an arc of a circle, a center of the curved surface of the second portion is located on a plane extending perpendicular to a longitudinal axis of the fastener at a level where the first portion of the catching section ends and within a boundary of the catching section.

9. The fastener according to claim 1, wherein a first diameter of the body section of the shaft is larger than a second diameter of a first portion of the catching section.

10. The fastener according to claim 1, wherein a length of the coupling section of the shaft is between 0.6 and 6.0 times a length of the catching section.

11. The fastener according to claim 1, wherein a length of a second portion of the catching section is between 0.1 and 3 times a thread pitch.

12. A fastener system configured to prevent cross threading, comprising;

a female fastener, wherein the female fastener has a center hole where a continuous helical threaded portion with threads extends along the hole towards a longitudinal axis of the female fastener, and a male fastener, wherein the male fastener engages into the female fastener, wherein the male fastener comprises a shaft, wherein the shaft comprises two sections composed of a body section and a coupling section, and has a threaded portion comprising more than one thread with first and second minor diameters and first and second major diameters, and the threaded portion extends helically around an outer surface of the shaft starting from any level, a head, wherein the head transfers torque applied by a tool to the shaft for tightening and loosening, a catching section, wherein the catching section is adjacent to the shaft and guides the fastener and wherein the catching section is thread-free, wherein the threaded portion extending helically around the shaft runs continuously from the body section to the coupling section of the shaft, and the threaded portion in the coupling section has incomplete threads, wherein a difference between the second minor diameter and the second major diameter decreases gradually towards the catching section such that the threaded portion ends in the coupling section where said difference is zero, which is adjacent to the catching section.

13. The fastener system according to claim 12, wherein the coupling section of the shaft has a curved surface.

14. The fastener system according to claim 13, wherein the coupling section of the shaft has the curved surface tangent to the body section of the shaft at an intersection of a plane extending perpendicular to a longitudinal axis of the fastener at a level where the body section ends and an end of the body section.

15. The fastener system according to claim 13, wherein the curved surface of the coupling section of the shaft denotes an arc of a circle, a center of the curved surface of the coupling section is located on a plane extending perpendicular to a longitudinal axis of the fastener from a level where the body section of the shaft ends and outside a boundary of the shaft.

16. The fastener system according to claim 12, wherein the catching section comprises a first portion and a second portion.

17. The fastener system according to claim 16, wherein the second portion of the catching section has a curved surface.

18. The fastener system according to claim 17, wherein the second portion of the catching section has the curved surface tangent to the first portion of the catching section at an intersection of a plane extending perpendicular to a longitudinal axis of the fastener at a level where the first portion of the catching section ends and an end of the first portion of the catching section ends.

19. The fastener system according to claim 17, wherein the curved surface of the second portion of the catching section donates an arc of a circle, a center of the curved surface of the second portion is located on a plane extending perpendicular to a longitudinal axis of the fastener at a level where the first portion of the catching section ends and within boundaries of the catching section.

20. The fastener system according to claim 12, wherein a first diameter of the body section of the shaft is larger than a second diameter of a first portion of the catching section.

21. The fastener system according to claim 12, wherein a length of the coupling section of the shaft is between 0.6 and 6.0 times a length of the catching section.

22. The fastener system according to claim 12, wherein a length of a second portion of the catching section is between 0.1 and 3 times a thread pitch.

* * * * *